United States Patent
Lohtia et al.

(10) Patent No.: US 7,133,385 B2
(45) Date of Patent: Nov. 7, 2006

(54) NETWORK DIRECTED INTERSYSTEM HANDOFF FOR 1XEVD0

(75) Inventors: Anit Lohtia, Plano, TX (US); Miroslav Budic, Murphy, TX (US)

(73) Assignee: Nortel Networks Limited, St. Laurent (CA)

( * ) Notice: Subject to any disclaimer, the term of this patent is extended or adjusted under 35 U.S.C. 154(b) by 1122 days.

(21) Appl. No.: 10/112,348

(22) Filed: Mar. 29, 2002

(65) Prior Publication Data

US 2003/0185183 A1    Oct. 2, 2003

(51) Int. Cl.
*H04Q 7/00* (2006.01)
*H04Q 7/20* (2006.01)
*H04B 7/216* (2006.01)

(52) U.S. Cl. ............ 370/331; 370/335; 370/342; 455/437

(58) Field of Classification Search ............ None
See application file for complete search history.

(56) References Cited

U.S. PATENT DOCUMENTS

| | | | |
|---|---|---|---|
| 5,666,650 A | | 9/1997 | Turcotte et al. |
| 6,415,149 B1* | | 7/2002 | Bevan et al. ............... 455/442 |
| 6,434,387 B1* | | 8/2002 | Lee ............... 455/436 |
| 6,671,265 B1* | | 12/2003 | Hwang et al. ............... 370/331 |
| 6,725,043 B1* | | 4/2004 | Bonta et al. ............... 455/437 |
| 6,983,148 B1* | | 1/2006 | Kirla ............... 455/436 |
| 7,016,326 B1* | | 3/2006 | Holcman et al. ............ 370/331 |

FOREIGN PATENT DOCUMENTS

| | | |
|---|---|---|
| EP | 0 888 026 A | 12/1998 |
| WO | WO 00 76243 A | 12/2000 |
| WO | WO 01 20938 A | 3/2001 |

* cited by examiner

Primary Examiner—Chi Pham
Assistant Examiner—Melanie Jagannathan
(74) Attorney, Agent, or Firm—Garlick Harrison & Markison; James A. Harrison (57) ABSTRACT

An ANC is formed to "dummy fill" a neighbor list that is to be transmitted to a mobile terminal that is presently located in a border cell with neighboring BTSs for which a hand-off request cannot be granted. Accordingly, while a hand-off cannot occur to a BTS of a proximate cell that does not qualify as a neighbor because it is serviced by a different ANC in a 1xEVDO network, identifying the BTSs of the non-neighbor and proximate cells ("dummy list BTSs") prompts the mobile terminal to request a hand-off to a dummy list BTS when the BTS provides a better pilot signal. Because the ANC can readily identify the BTS from the dummy list, it knows that a hand-off cannot be facilitated therefor. Accordingly, the ANC instructs the mobile terminal to drop the call (data packet connection). Because many wireless data packet networks utilize at least a subset of established IP protocols and are able to establish point-to-point protocol communication links (higher layer communication links), commanding a mobile terminal to drop the call is a command to drop the call at the lower layers. The point-to-point protocol communication link is then resumed and the effect of a hand-off is achieved.

10 Claims, 7 Drawing Sheets

NETWORK DIRECTED INTERSYSTEM HANDOFF FOR 1XEVD0

BACKGROUND

1. Field of the Invention

The present invention relates to mobile communication devices and, more particularly, the present invention relates to mobile terminals capable of communicating in a data-only mode with a data network, as well as mobile terminals capable of communicating in voice and data modes.

2. Related Art

Wireless communication service providers, as well as Internet service providers, face some difficult challenges as the various networks are increasingly modified to work together to provide seamless end-to-end call connectivity across the various platforms. Ever-increasing residential dial-up subscribers demand available modem (or ISDN) ports, or threaten to take their business elsewhere. To meet this demand, Internet service providers are deploying a large number of complex, port-dense network access servers (NAS) to handle thousands of individual dial-up connections. As such, small and large, as well as private and public, wireless data networks are being created to seamlessly interact with large wire line networks to enable users to establish point-to-point connections independent of terminal type and location. Traditionally, however, voice networks have paved the way for the creation of data networks as users loaded the voice networks trying to transmit data, including streaming data (video and voice). Initially, traditional Public Switched Telephone Networks (PSTNs) were used for data transmissions but have been largely supplanted by data packet networks, including various versions of the "Internet".

The wireless domain has had a parallel history. Initial voice networks, including Amps, Time Division Multiple Access (TDMA) including North American TDMA and Global System for Mobile Communications (GSM), were used to conduct data in a limited capacity. These networks are being replaced, however, by newer wireless data-only networks, as well as data and voice networks.

The structure and operation of wireless communication systems are generally known. Examples of such wireless communication systems include cellular systems and wireless local area networks, among others. Equipment that is deployed in these communication systems is typically built to support standardized operations, i.e., operating standards. These operating standards prescribe particular carrier frequencies, modulation types, baud rates, physical layer frame structures, MAC layer operations, ink layer operations, etc. By complying with these operating standards, equipment interoperability is achieved.

In a cellular system, a regulatory body typically licenses a frequency spectrum for a corresponding geographic area (service area) that is used by a licensed system operator to provide wireless service within the service area. Based upon the licensed spectrum and the operating standards employed for the service area, the system operator deploys a plurality of carrier frequencies (channels) within the frequency spectrum that support the subscriber units within the service area. Typically, these channels are equally spaced across the licensed spectrum. The separation between adjacent carriers is defined by the operating standards and is selected to maximize the capacity supported within the licensed spectrum without excessive interference. In most cases, severe limitations are placed upon the amount of co-channel and adjacent channel interference that maybe caused by transmissions on a particular channel.

In cellular systems, a plurality of base stations is distributed across the service area. Each base station services wireless communications within a respective cell. Each cell may be further subdivided into a plurality of sectors. In many cellular systems, e.g., GSM cellular systems, each base station supports forward link communications (from the base station to subscriber units) on a first set of carrier frequencies, and reverse link communications (from subscriber units to the base station) on a second set of carrier frequencies. The first set and second set of carrier frequencies supported by the base station are a subset of all of the carriers within the licensed frequency spectrum. In most, if not all, cellular systems, carrier frequencies are reused so that interference between base stations using the same carrier frequencies is minimized and system capacity is increased. Typically, base stations using the same carrier frequencies are geographically separated so that minimal interference results.

Traditional wireless mobile networks include Mobile Station Controllers (MSCs), Base Station Controllers (BSCs) and Base Transceiver Station (BTS) systems that jointly operate to communicate with mobile stations over a wireless communication link. Examples of common networks include the GSM networks, North American TDMA networks and Code Division Multiple Access (CDMA) networks. Extensive infrastructures (e.g., ANSI-41 or MAP-based networks) exist in the cellular wireless networks for tracking mobility, distributing subscriber profiles, and authenticating physical devices.

To establish a wireless communication link in traditional wireless voice networks, an MSC communicates with a BSC to prompt the BTS (collectively "Base Station" or "BS") to generate paging signals to a specified mobile station within a defined service area typically known as a cell or sector (a cell portion). The mobile station, upon receiving the page request, responds to indicate that it is present and available to accept an incoming call. Thereafter, the BS, upon receiving a page response from the mobile station, communicates with the MSC to advise it of the same. The call is then routed through the BS to the mobile station as the call setup is completed and the communication link is created. Alternatively, to establish a call, a mobile station generates call setup signals that are processed by various network elements in a synchronized manner to authenticate the user as a part of placing the call. The authentication process includes, for example, communicating with a Home Location Register (HLR) to obtain user and terminal profile information.

The next generation of cellular networks presently being developed are being modified from traditional systems to create the ability for mobile stations to receive and transmit data in a manner that provides greatly increased throughput rates. For example, many new mobile stations, often referred to as mobile terminals or access terminals, are being developed to enable a user to surf the web or send and receive e-mail messages through the wireless mobile terminal, as well as to be able to receive continuous bit rate data, including so called "streaming data". Accordingly, different systems and networks are being developed to expand such capabilities and to improve their operational characteristics.

One example of a system that is presently being deployed with voice and data capabilities is the CDMA2000 network. The CDMA2000 network, however, is developed from the IS-95 networks that were optimized for voice transmissions and therefore is not optimized for transmitting data even though its data transport capability is significantly improved from prior art networks and systems. More formally, the 1xRTT standard defines CDMA operation for data transmissions.

One data-only network that is being developed is defined by the 1xEVDO standard. The 1xEVDO standard defines a time burst system utilizing a 1.25 MHz carrier that is set at a carrier frequency that is adjacent to the frequencies used by the voice networks. In one particular network, a 1.67 millisecond (mS) burst is used for the forward link in a 1xEVDO network. Typical 1xEVDO networks include a Packet Data Service Node (PDSN) for performing routing and switching for a data packet or data packet stream, an Access Network Controller (ANC) that establishes and manages the wireless communication link with the mobile terminal, and a Packet Control Function (PCF) that is largely an interface device for converting signals between the packet domain and a wireless network that will be used for the communication link.

The 1xEVDO network is optimized for forward link data applications. The next generation of 1xRTT networks that are being deployed can communicate with voice and data networks but do not process data as efficiently as the networks formed according to the 1xEVDO standard. Newer networks are also being designed and have evolved from the 1xEVDO standard, including 1xEVDV, which is for transmitting data as well as voice.

The 1xEVDO networks that have been previously described are not formed, however, to interact seamlessly between the voice and data networks. For example, the 1xEVDO networks do not have or fully utilize Signaling System Number 7 (SS7) type network components to assist with call setup, user and mobile station authentication, call routing, and feature delivery. The 1xEVDO networks are formed to carry data only and do not include the full functionality and capabilities of wireless voice networks. The infrastructure of the 1xEVDO network is different and simpler than SS7-based voice networks (wire line or wireless).

1xEVDO does not provide all hand-off capabilities and functionality of typical voice networks. Accordingly, present mobile terminals only provide some of these traditional voice network features and, in some cases, only in a rudimentary way. For example, the designs in the 1xEVDO standard only provide for user authentication, not terminal authentication. Because traditional SS7-type network components are not fully available in 1xEVDO networks, compatibility and control problems are readily noticeable.

One problem that has been identified in some packet data networks, including 1xEVDO networks, is that a mobile terminal that is geographically moving to a new cell area cannot always be handed off to the BTS of the new cell area. More specifically, 1xEVDO standards do not provide for inter-ANC hand-offs. Accordingly, a mobile terminal transitioning into a new cell that is served by a different ANC will tend to "drag" the communication link from the BTS with which it is communicating thereby creating interference and other problems in the new cell area. What is needed, therefore, is mechanism for allowing the mobile terminal to transition between cells whose BTSs are operatively coupled to different ANCs.

SUMMARY OF THE INVENTION

An ANC is formed to include logic and circuitry to "dummy fill" a neighbor list that is to be transmitted to a mobile terminal that is presently located in a border cell. Accordingly, while a hand-off cannot occur to a BTS of a proximate cell that does not qualify as a neighbor because it is serviced by a different ANC in a 1xEVDO network, identifying the BTSs of the non-neighbor and proximate cells ("dummy list BTSs") prompts the mobile terminal to request a hand-off to a dummy list BTS. Because the ANC can readily identify the BTS from the dummy list, it knows that a handoff cannot be facilitated therefor. Accordingly, the ANC instructs the mobile terminal to drop the call (data packet connection). Because many wireless data packet networks utilize at least a subset of established IP protocols and are able to establish point-to-point protocol communication links (higher layer communication links), commanding a mobile terminal to drop the call is a command to drop the call at the lower layers. Accordingly, a point-to-point protocol communication link may continue to remain in effect as the physical layer link is dropped and then reinitiated by the mobile terminal with the BTS providing the strongest pilot channel signal (presumably the new cell into which the mobile terminal had traveled). Thus, the effect of a hand-off is achieved even though 1xEVDO does not support inter-ANC/BSC hand-offs thereby preventing the mobile terminal from undesirably dragging a communication link into a dummy list cell and undesirably interfering with users therein.

BRIEF DESCRIPTION OF THE DRAWINGS

A better understanding of the present invention can be obtained when the following detailed description of the preferred embodiment is considered with the following drawings, in which.

DETAILED DESCRIPTION OF THE DRAWINGS

Figure 1:
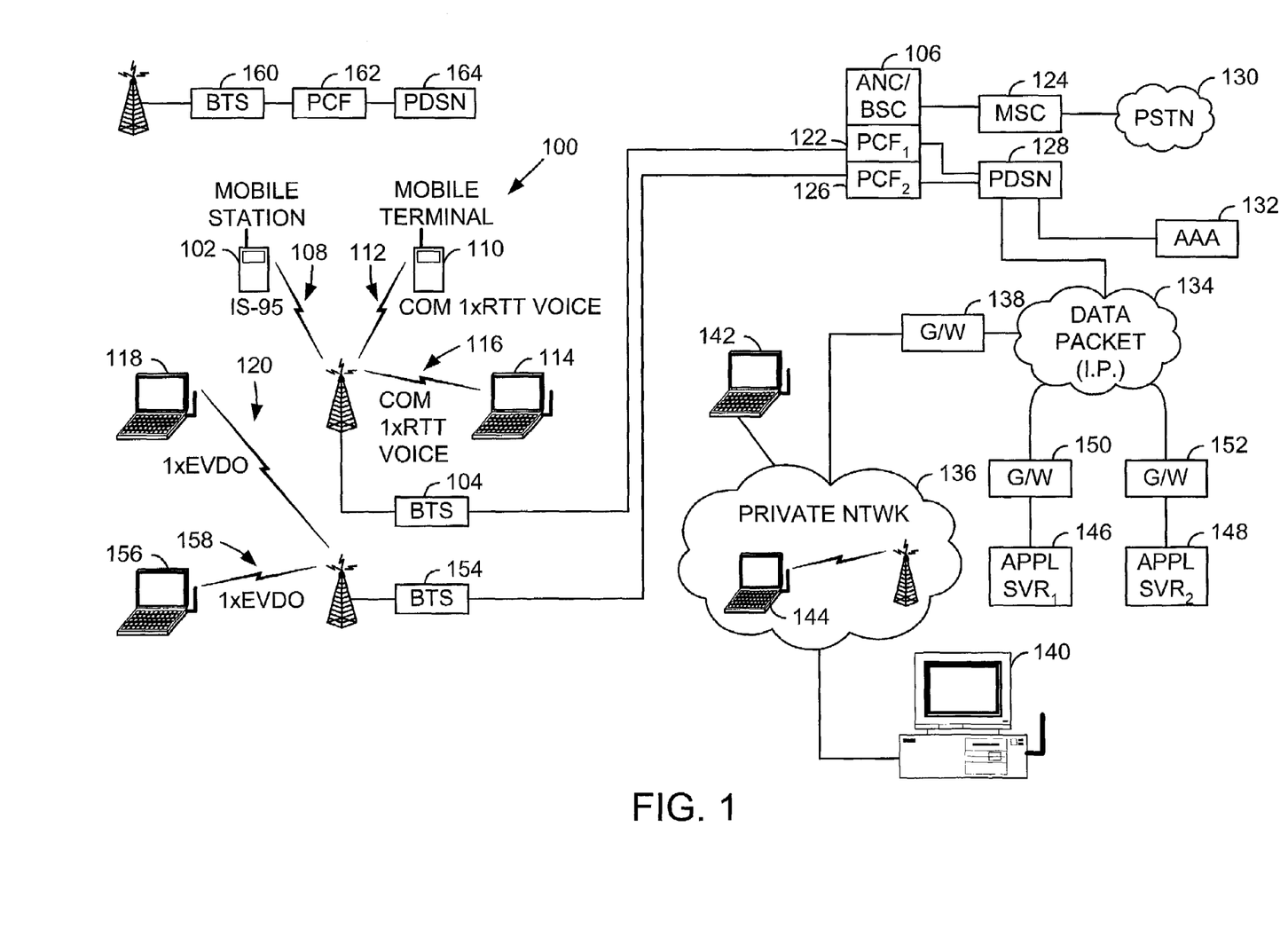
FIG. 1 is a functional block diagram of a communication network formed according to one embodiment of the present invention.

FIG. 1 is a functional block diagram of a communication network formed according to one embodiment of the present invention. As may be seen, a communication network 100 includes many networks that are coupled to operatively communicate with each other to enable a user in one type of network to communicate with a user in a different type of network. For example, the communication network 100 creates an ability for a wire line user terminal coupled to a private network to communicate with a mobile terminal through a wireless communication link. Such transparent operation with respect to the user is improving access to information and the ability for individuals to communicate to a level that is unprecedented. As discussed before, existing wireless networks have, heretofore, been adapted primarily for carrying voice calls. Accordingly, when used in conjunction with a computer terminal, the wireless voice networks were able to transmit or receive data at rates that today are viewed as unacceptably slow although they were appreciated at the outset.

Along these lines, a mobile station 102 is located within a geographic area served by a Base Transceiver Station (BTS) 104 that is coupled to a Base Station Controller (BSC) 106. More specifically, mobile station 102 communicates with BTS 104 by way of an IS-95 CDMA wireless communication network link shown generally at 108. Similarly, a mobile terminal 110 that is capable of supporting both voice and data calls communicates with BTS 104 over a wireless communication link shown generally at 112 and establishes either voice calls or data calls under the CDMA2000 1xRTT protocols. In the example herein, mobile terminal 110 is engaged in a voice call, as defined by a service option generated by a mobile terminal during call setup, and thus wireless communication link 112 is transmitting merely voice signals and associated control signaling.

Similarly, a mobile terminal 114 is engaged in a data call according to 1xRTT protocols over a wireless communication link shown generally at 116. Finally, a mobile terminal 118 is engaged in a data call over a wireless communication link, shown generally at 120, according to 1xEVDO protocols in a so called "simple-IP" or "mobile-IP" network, as those terms are understood by one of average skill in the art. In general, simple-IP and mobile-EP networks do not include control-signaling protocols that are as extensive as some existing systems. In particular, simple-IP and mobile-IP networks do not include a "heartbeat" mechanism used to determine that a wireless terminal is present and in an operation mode of operation.

The 1xEVDO network of the described embodiment is a high data rate, high performance and cost effective wireless data packet solution that offers high capacity and is optimized for packet data services. It provides a peak data rate, under current technology, of 2.4 Mbps within one CDMA carrier operating at a bandwidth of 1.2 MHz and supports Internet protocols and further facilitate an "always on" connection so that users are able to rapidly send and receive wireless data. Along these lines, the 1xEVDO network is formed to support connectionless communication links in contrast to traditional connection-oriented networks, such as the PSTN, and transmits Protocol Data Units (PDUs) which comprise data packets layered in a protocol such as an IP protocol. In general, the 1xEVDO transmits the PDUs in a bursty fashion notwithstanding its underlying CDMA technology. For hybrid mobile terminals capable of supporting both voice and data calls, the 1xEVDO transmits the PDUs for the data on separate 1.25 MHz channels with respect to voice thereby achieving higher system capacity.

1xEVDO network topology is a little different from traditional wireless networks, including 1xRTT data networks. More specifically, while wireless voice networks and 1xRTT data networks all include the use of a BSC and MSC for call control and call routing, a 1xEVDO system merely communicates through the radio with ANC that in turn communicates with a packet data serving node which in turn is coupled to a data packet network such as the Internet.

Continuing to examine FIG. 1, BTS 104 is coupled to communicate with ANC/BSC 106. As is understood by one of average skill in the art, Access Network Controllers (ANCs) and Base Station Controllers (BSCs) have similar functionality. Moreover, Packet Control Function Cards can be installed either within a BSC or within an ANC according to whether the PCF is to communicate with a 1xRTT device or a 1xEVDO device, respectively. Additionally, in one embodiment of the invention, one ANC/BSC is formed with 1xRTT and 1xEVDO equipment therewithin to be multi-network capable. Thus, the embodiment of FIG. 1 contemplates such a configuration although it is to be understood that the BSC and ANC elements may readily be separated or formed as stand alone units.

Within ANC/BSC 106, according to one embodiment of the present invention, a plurality of different wireless network cards are included to facilitate communications with mobile stations and mobile terminals of differing protocols and types. For example, in the described embodiment, ANC/BSC 106 includes circuitry to communicate with mobile station 102 over IS-95 CDMA wireless communication network link as shown generally at 108. ANC/BSC 106 further includes a Packet Control Function (PCF) card 122 for communicating with mobile terminals 110 and 114 utilizing 1xRTT protocols in one described embodiment of the invention. As may be seen, PCF 122, which is for communicating with 1xRTT protocol devices, is coupled to an MSC 124. A PCF 126, however, is for communicating with 1xEVDO devices and thus it is coupled directly to a Packet Data Serving Node (PDSN) 128. Thus, mobile terminal 118 that communicates over wireless communication link 120 according to 1xEVDO communication protocols, communicates with BTS 154 and with PCF 126 formed within ANC/BSC 106 according to one embodiment of the present invention. It is understood, of course, that PCF 126 may readily be formed as a distinct device rather than within a rack of ANC/BSC 106. Moreover, PCF 126 may communicate with mobile terminal 118 through distinct radio equipment and, thus, through a BTS other than BTS 154 as shown herein.

MSC 124 further is coupled to a PSTN 130. Accordingly, calls routed through MSC 124 are directed either to other MSCs (not shown herein) or to external networks by way of PSTN 130. The reference to PSTN herein includes SS7 and other similar "intelligent networks". Thus, a gateway device (not shown herein) coupled to PSTN 130, may be used to access a data packet network, such as the Internet, for any data calls transmitted according to 1xRTT protocols. 1xEVDO calls, which are processed by PCF 126, however, are forwarded through PDSN 128, which, upon authentication by an Authentication, Authorization and Accounting (AAA) server 132, is connected to a data packet network, such as a data packet network 134, which, in this example, comprises the Internet. As may further be seen, data packet network 134 is coupled to a private network 136 by way of a gateway device 138. Private network 136 further is coupled through traditional wire line networks to a user terminal 140 and 142. Moreover, in the described embodiment of the invention, private network 136 includes a wireless LAN formed according to 802.11b protocol standards that facilitates connection to a wireless terminal 144.

Data packet network 134 further is coupled to a plurality of application servers, such as application servers 146 and 148 by way of gateway devices 150 and 152, respectively. Continuing to refer to FIG. 1, ANC/BSC 106 further is coupled to a BTS 154, which is in communication with a mobile terminal 156 by way of a 1xEVDO communication link 158. As may be seen, mobile terminal 156 is served by PCF 126, as is mobile terminal 118, although they are served by different BTSs, namely BTSs 154 and 104, respectively. Additionally, however, a BTS 160 is coupled to a PCF 162 that, in turn, is coupled to communicate with a PDSN 164.

Any one of the mobile terminals 156 or 118 may also communicate through PCF 162 and PDSN 164 whenever they travel through a geographic region that is served by BTS 160. As will be described in greater detail below, the present invention deals in part with the situation in which a data packet connection has been established between a mobile terminal in which the mobile terminal then transitions to a service area covered by a different PDSN. Accordingly, if, for example, mobile terminal 156 transitions to a new service area, for example, mobile terminal 156 transitions from a service area that is served by PDSN 128 to a service area that is served by PCF 162 by way of BTS 160. Current standards do not provide for hand-off from one ANC to another. The present invention contemplates broadcasting "dummy" neighbor-list information to the mobile terminals within the cell to prompt them to generate a hand-off request whenever they transition with a cell served by a different ANC. Thus, if mobile terminal 156 requests a hand-off, the serving PCF then instructs mobile terminal 156 to drop the present call. Mobile terminal 156 will then reestablish a data connection with PCF 162 through BTS 160.

Figure 2:
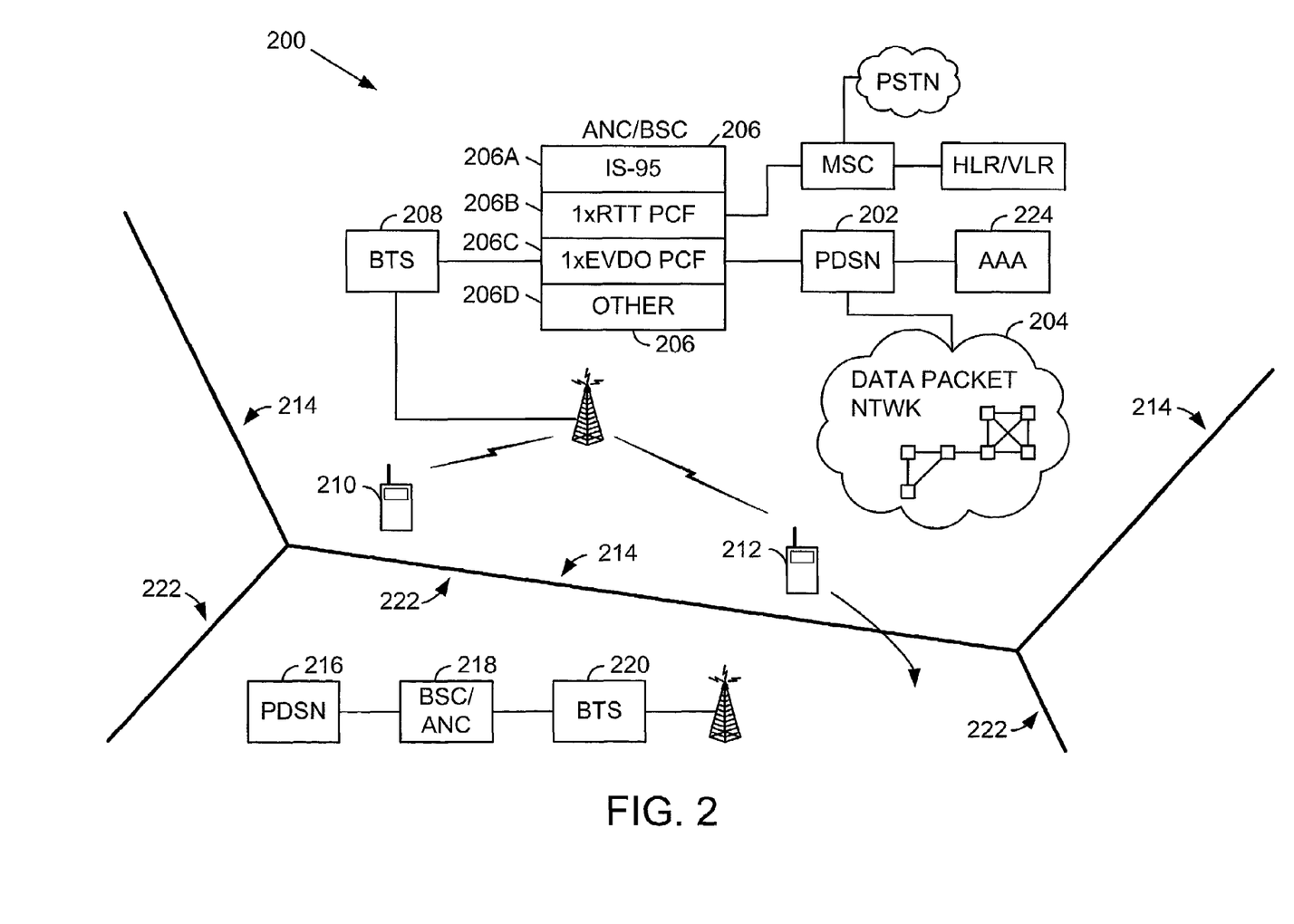
FIG. 2 is a functional block diagram that illustrates one embodiment of the present invention.

FIG. 2 is a functional block diagram that illustrates one embodiment of the present invention. As may be seen, a PDSN 202 is coupled to a data packet network 204, as well as to a ANC/BSC 206. As is known by one of average skill in the art, an ANC provides functionality similar to that of base station controllers. Given the present embodiment in which cards of the different network types that operate according to different protocols are all formed within one box, the described example includes a box that includes ANC/BSC functionality and, accordingly, is referenced as such. More particularly, ANC/BSC 206 includes an IS-95 card 206A, a 1xRTT PCF card 206B, and a 1xEVDO PCF card 206C, in addition to other circuitry shown at 206D. Moreover, as systems evolve and, for example, 1xEVDO migrates to providing support for voice calls also, 1xEVDO PCF card 206C may well be replaced by a 1xEVDV PCF card, which supports both voice, and data calls.

ANC/BSC 206 further is coupled to a BTS 208 that communicates with a plurality of mobile terminals 210 and 212. Moreover, as may be seen, BTS 208 serves mobile terminals 210 and 212 that are within a defined geographic area represented by geographic marker 214. Geographic marker 214 may, for example, represent the boundaries of a wireless cell, which, for a 1xEVDO system may not necessarily correspond to a defined cell area for a voice network, such as an IS-95 network served by IS-95 card 206A.

Data packet network 204 includes a plurality of switches that serve to route individual data packets to a terminating destination as is known by those of average skill in the art. While not shown explicitly here, it is understood, that data packet network 204 further is coupled to gateway devices and servers of other types for creating a point-to-point protocol communication link with mobile terminals, such as mobile terminals 210 and 212.

Continuing to refer to FIG. 2, it may be seen that a network shown generally at 200 further includes a second PDSN 216 that is coupled to a ANC/BSC 218 that further is coupled to a BTS 220 that defines a second cell area as indicated by geographic marker 222. As may be seen, mobile terminal 212 is headed in a direction to transition from the cell area served by BTS 208 to a cell area served by BTS 220. For the present example, it is assumed that mobile terminal 212 is in a dormant state. Prior to transitioning into a dormant state, however, mobile terminal 212 must establish a communication link to have network resources allocated to it. Thus, as a part of initially establishing the call, mobile terminal 212 transmits communication control signals to BTS 208 to set up a call. BTS 208 communicates with 1xEVDO PCF 206C, which, in turn, communicates with PDSN 202. PDSN 202 communicates with an AAA server 224 to authenticate the mobile station prior to granting network resources thereto. Thus, once a point-to-point protocol communication link is established between mobile terminal 212 and a device coupled to data packet network 204 by way of BTS 208, 1xEVDO PCF 206C and PDSN 202, mobile terminal 212 transitions into a dormant state as it travels from the cell served by BTS 208 to the cell served by BTS 220. Once within the cell served by BTS 220, it is presumed that mobile terminal 212 resumes activity and communications through PDSN 216 as is defined by the standards and known by those of average skill in the art.

Figure 3:
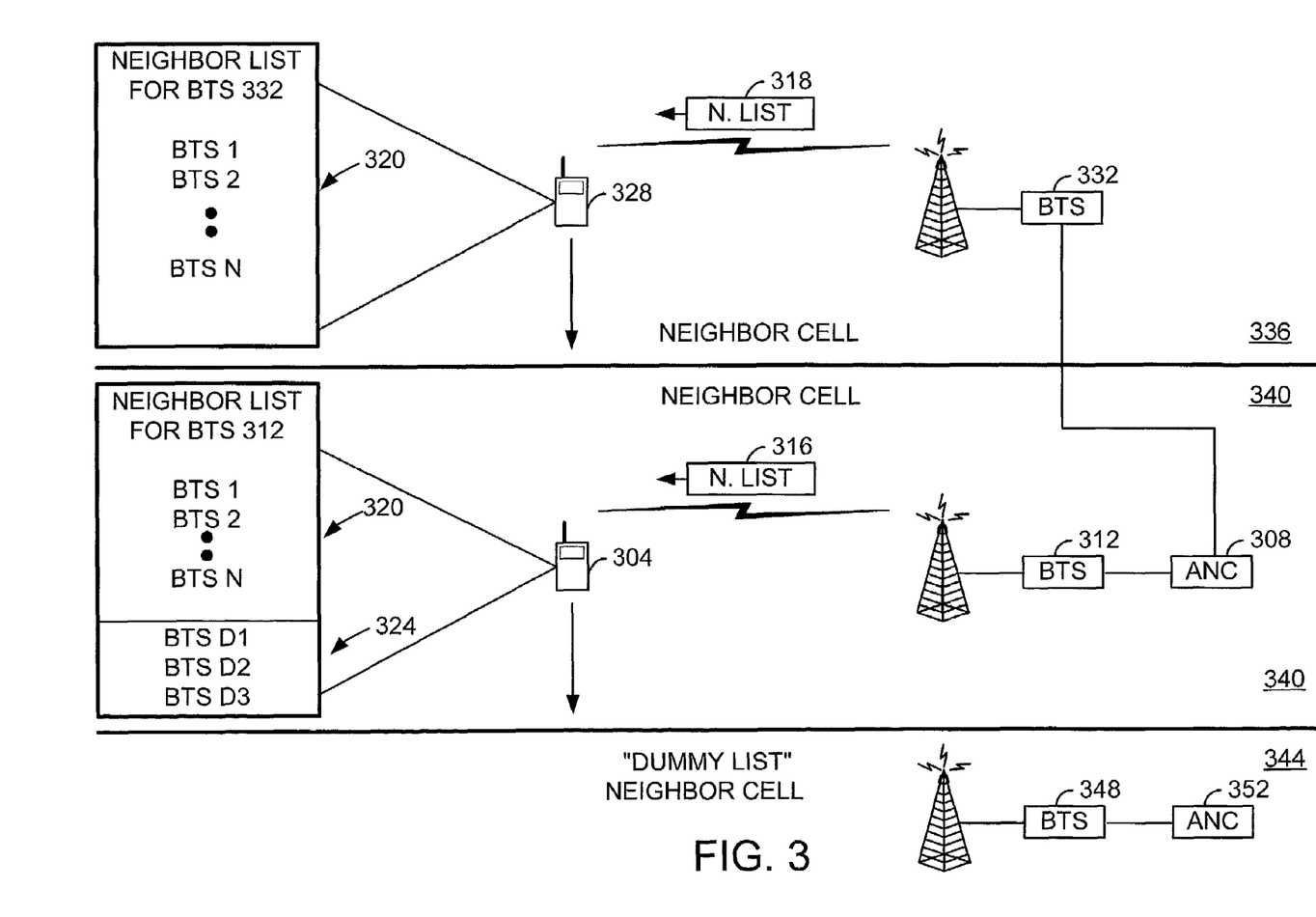
FIG. 3 is a functional block diagram of a wireless data packet network illustrating the operation of an access network controller formed according to one embodiment of the present invention.

FIG. 3 is a functional block diagram of a wireless data packet network illustrating the operation of an access network controller formed according to one embodiment of the present invention. Referring now to FIG. 3, a mobile terminal 304 is communicatively coupled with an ANC 308 by way of a BTS312. As may be seen, ANC 308 is formed to generate a neighbor-list 316 that is transmitted to mobile terminal 304 by way of BTS 312. The neighbor-list 316 includes a list of all BTSs that are physically proximate to BTS 312 and to which a hand-off is allowed. Neighbor-list 316 further includes a "dummy list" of BTSs to which an actual hand-off may not be had. In 1xEVDO networks, the infrastructure standards only provide for hand-off from one BTS to another that is served by the same ANC. Accordingly, a problem exists when a mobile terminal is transitioning from one cell to another physically proximate cell that is served by a different ANC. Because 1xEVDO does not provide for hand-offs in such a situation, a mobile terminal will continue to drag a communication link from an old BTS into a new cell area and not transfer the communication link to the new BTS thereby creating the interference and other problems. Thus, as may be seen, the neighbor-list 316 that is transmitted by ANC 308 includes a first grouping of BTSs which define actual neighbors to which a hand-off is allowed, the first group being shown generally at 320, and a second group of dummy list BTSs shown generally at 324 to which a hand-off may not be had. Given the operational logic formed in existing mobile terminals, however, the dummy list BTSs in portion 324 will prompt the mobile terminal to request a hand-off thereto.

To explain in more detail, a mobile terminal 328 is coupled to communicate with ANC 308 by way of a BTS 332. ANC 308 generates a neighbor list 318 to mobile terminal 328 by way of BTS 332. Mobile terminal 328 does not receive a dummy list of neighbors in its neighbor-list as does mobile terminal 304 because all of its proximate cells are served by ANC 308. As may be seen, therefore, as mobile terminal 328 transitions from a neighbor cell shown generally at 336 to a neighbor cell 340, handoff from BTS 332 to BTS 312 may be had because both BTSs 332 and 312 are coupled to ANC 308. Thus, as mobile terminal 328 receives pilot channel transmissions from BTS 332 that are not as strong as pilot channel transmissions from BTS 312, it will request a hand-off to BTS 312, which is identified in its neighbor-list. ANC 308 will then take steps, as is known by those of average skill in the art, to effectuate the handoff. In the situation where a mobile terminal, for example, mobile terminal 304, moves into a non-recognized physically proximate cell, such as a cell 344, a handoff is not supported from BTS 312 to a BTS 348. The reason is that BTS 348 is coupled to an ANC 352 and not ANC 308. Because the 1xEVDO standard does not provide for hand-off from one ANC to another, BTS 348 is not able to transmit forward link data packets to mobile terminal 304 as it transitions into cell 344 even if it is able to provide a clearer signal to mobile terminal 304 because the ANC does not provide a stream of data packets to more than one BTS at a given time (thereby precluding inter-ANC hand-off). Thus, even though cell 344 is physically proximate to neighbor cell 340 and would be a neighbor in a traditional cellular network, cell 344 cannot be placed on a neighbor-list for handoff because a handoff to it cannot occur under current design implementation.

Because of this, under current design approaches, BTS 348 of cell 344 is not listed in the neighbor-list for mobile terminal 304. ANC 308 would only include those BTSs in its neighbor-list 316 to which a hand-off may occur. In the described embodiment of the invention, however, BTS 348 is "dummy filled" into neighbor-list 316 by ANC 308. Accordingly, as mobile terminal 304 transitions into cell 344 and determines that the pilot signal from BTS 348 is stronger than the pilot signal from BTS 312, mobile terminal 304 will request a hand-off to BTS 348. Because a hand-off may not occur in a 1xEVDO system to BTS 348, however, ANC 308 responds differently than it would for an actual hand-off. Rather, ANC 308 determines that mobile terminal 304 is requesting hand-off to a "dummy" neighbor and, thus, ANC 308 directs mobile terminal 304 to drop the present call. The assumption is made that when ANC 308 directs mobile terminal 304 to drop the call, mobile terminal 304 will be able to reestablish a data connection through BTS 348 and ANC 352 with signals that are clearer and stronger that can be provided by BTS 312.

Figure 4:
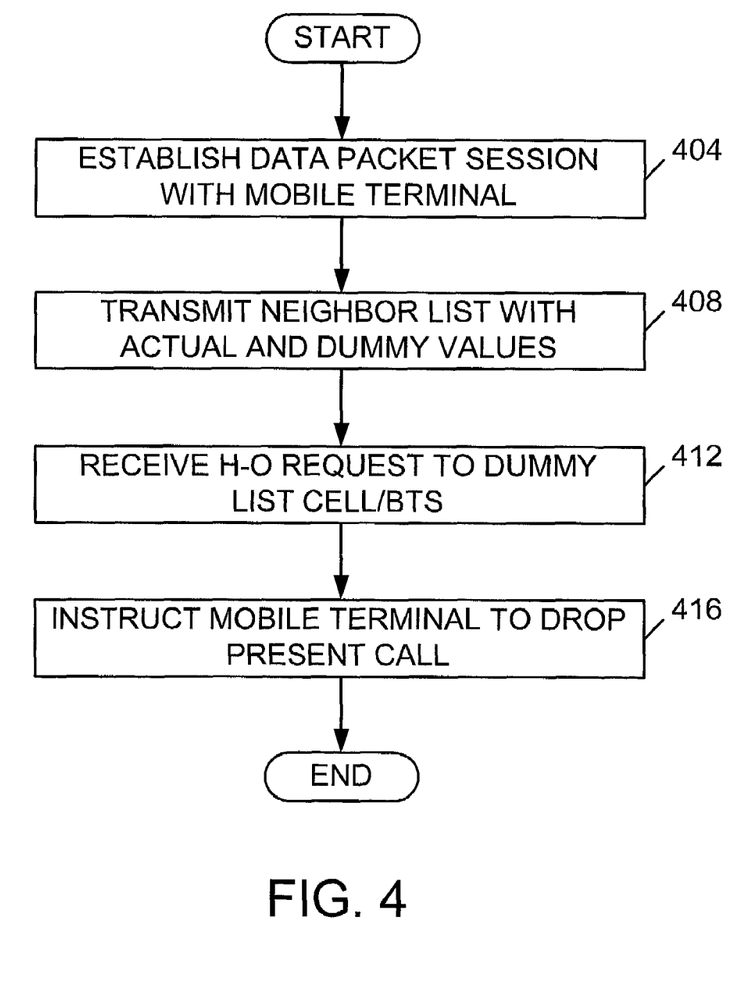
FIG. 4 is a flowchart that illustrates the first aspect of one embodiment of the inventive method.

FIG. 4 is a flowchart that illustrates the first aspect of one embodiment of the inventive method. Initially, a data packet connection is established between an ANC and a mobile terminal (step 404). Shortly after the data packet connection has been established, an ANC transmits a neighbor-list to the mobile terminal with a list of actual neighbors and a dummy list of BTSs (step 408). The actual neighbors are the BTSs to which a hand-off may be had. Accordingly, as the signal strength from a BTS of the dummy list neighbor exceeds the signal strength of a present BTS serving the mobile terminal, the ANC will receive a hand-off request to the dummy list BTS (cell) (step 412). Upon receiving the hand-off request to the dummy list BTS (cell), the ANC will determine that the request was to a "dummy" cell and will respond by instructing the mobile terminal to drop the present call (step 416). The mobile terminal, given the existing logic formed there within, will drop the call as commanded and then will seek to establish a new data packet connection with a BTS providing the strongest pilot signal. Accordingly, the end result of a hand-off has occurred even though the data packet connection experienced an actual termination and required reestablishing with a new BTS.

Figure 5:
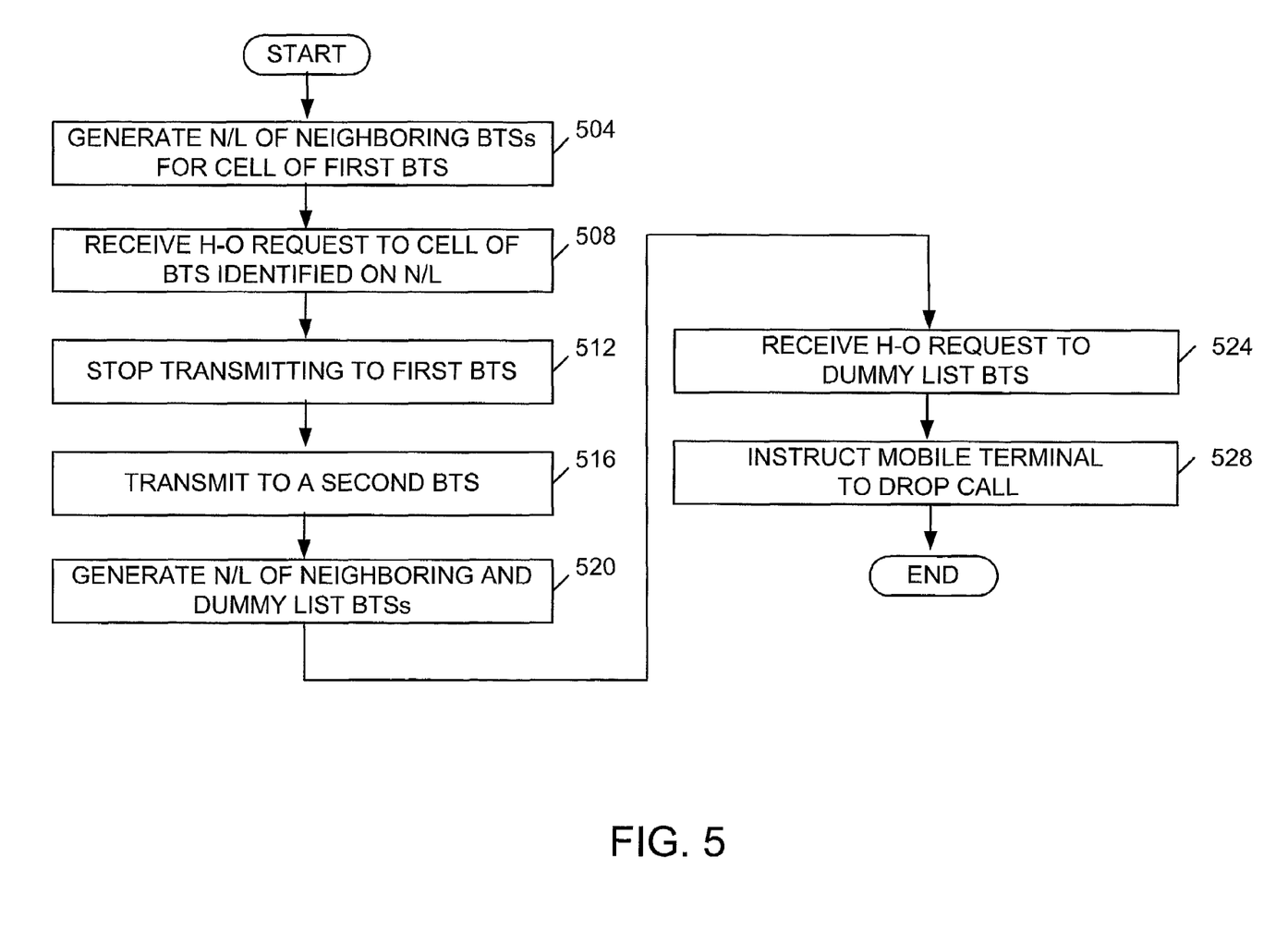
FIG. 5 is a flowchart illustrating the second aspect of one embodiment of the present invention.

FIG. 5 is a flowchart illustrating the second aspect of one embodiment of the present invention. Initially, an ANC/BSC generates a first neighbor-list of BTSs listing actual neighboring cells to which a mobile terminal may request a hand-off (step 504) for a cell of a first BTS. In some networks, one ANC/BSC may serve approximately 70–90 BTSs. Accordingly, for a mobile terminal within a given cell, a neighbor-list of cells to which it can request a hand-off will usually include any cell that is physically proximate to the present cell. For a mobile terminal that is in a border cell, however, the neighbor-list will not include all physically proximate cells, but only the physically proximate cells to which a hand-off may properly be requested under present 1xEVDO protocols. But in the present example of step 504, the neighbor-list includes all of the physically proximate cells because the mobile terminal is not within a border cell. Thereafter, as the mobile terminal begins to transition into a new cell and determines that the pilot signal of the new cell is stronger than the pilot signal cell supporting the data connection, the mobile terminal will request the hand-off to the new cell and, more specifically, to a second BTS of the new cell. Accordingly, the ANC/BSC will receive a hand-off request to the neighbor cell (step 508). Upon receiving the hand-off request to the neighbor cell, the ANC/BSC will stop transmitting to the first BTS (step 512) and will start transmitting to the second BTS, namely, the BTS of the neighbor cell (step 516). Thereafter, assuming that the new cell is a border cell, the ANC/BSC will generate a neighbor list for transmission to the mobile terminal through the second BTS, which second neighbor list will include actual and dummy list BTS IDs (step 520). Thereafter, as the pilot signal of a dummy list BTS becomes clearer or stronger than the pilot signal from the second BTS, the ANC/BSC will receive a hand-off request to the dummy list BTS of the physically proximate cell that is not classified as a neighbor cell (step 524). Upon receiving the hand-off request to the dummy list BTS, the ANC/BSC will determine that the hand-off request was to the dummy list BTS. Responsive to receiving the hand-off request to the dummy list BTS, the ANC/BSC will instruct the mobile terminal to drop the call, namely, the data packet connection (step 528).

In the described embodiment of the invention, the connection established between the mobile terminal and a PDSN by way of the various BTSs and ANCs is a point-to-point protocol communication link. Accordingly, the communication link is established at higher layers of operation, as is understood by those of average skill in the art, and therefore may be maintained even though the communication link has been dropped at the physical layer. In a worse case scenario, some data packets may be dropped as they are being transmitted when the forward link from the various ANC/BSCs and BTSs at a time that the mobile terminal drops a data packet connection and reestablishes a connection with a new BTS. This is acceptable, however, because typically such data is real-time streaming data for which retransmissions would be problematic and perhaps worse than merely losing the data. The present invention assumes the mobile terminal, upon being instructed to drop a data packet connection or call, will immediately attempt to reestablish a connection. Accordingly, while the inventive method includes steps taken by an ANC, it is understood that the mobile terminal, using the existing logic, will reestablish the communication link after being instructed to drop it.

Figure 6:
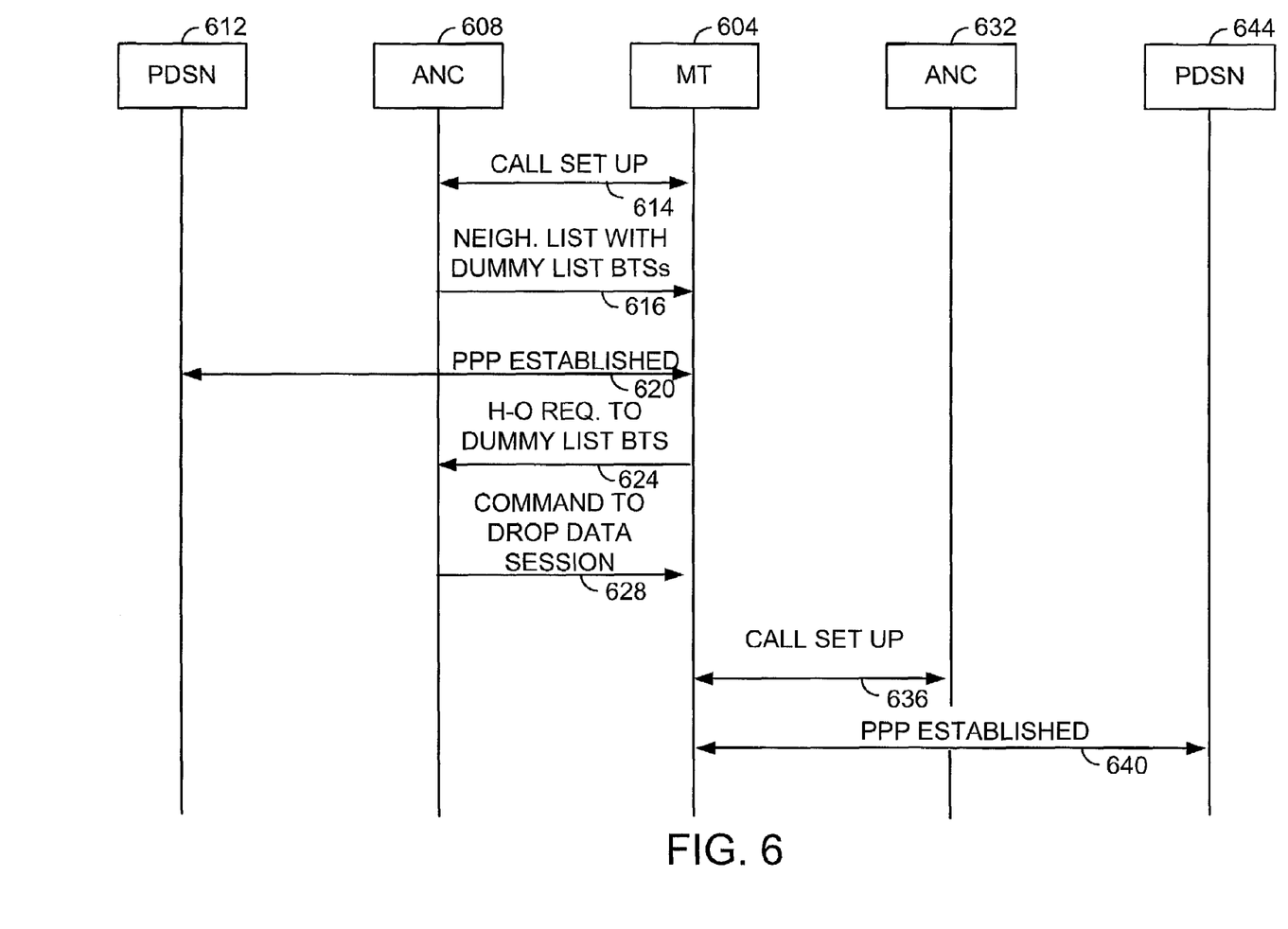
FIG. 6 is a single sequence diagram that further illustrates the operation of the present invention.

FIG. 6 is a signal sequence diagram that further illustrates the operation of the present invention. Initially, a mobile terminal 604 generates call setup signals, shown at 614, to an ANC 608 to establish a call. ANC 608 also generates a broadcast message with a neighbor list to all mobile terminals including mobile terminal 604 that are located within the same cell (that are receiving forward link transmissions from the same BTS) as shown at 616. The broadcast message with the neighbor list includes the dummy list of BTSs since, of the described example, the cell is a border cell and the mobile terminals therewithin, including mobile terminal 604 may move into a physically proximate cell that is serviced by a different or other ANC. ANC 608 then facilitates the creation of a point-to-point protocol communication link between mobile terminal 604 and a PDSN 612. As may be seen, the point-to-point protocol communication link is shown between mobile terminal 604 and PDSN 612 at 620. It is understood, of course, that PDSN 612 further establishes a communication link with an external device through a data packet network. Some time thereafter, mobile terminal 604 generates a hand-off request requesting a hand-off to one of the dummy list BTSs in a signal 624 that is transmitted to ANC 608. ANC 608, upon receiving signal 624, generates a command to mobile terminal 604 to drop the data packet connection in a signal 628. Thereafter, mobile terminal 604 drops the call and initiates call setup to reestablish the point-to-point protocol communication link, at a lower physical layer with ANC 632 in a signal 636. Thereafter, the point-to-point protocol communication link is reestablished between PDSN 612 and mobile terminal 604 as shown generally at 640. Alternatively, the point-to-point protocol communication link may be established between mobile terminal 604 and a PDSN 644 as is shown generally at 648.

Because 1xEVDO networks are for delivering data packets in a forward link only, they are implemented in a manner in which so called soft hand-off, as that term is known for voice networks, has not been implemented. Thus, a mobile terminal receives the forward link transmissions from only one cell or BTS at a time. When a decision is made to hand-off a mobile terminal from one cell to another, the ANC stops transmitting data packets to the first BTS or cell and begins transmitting to the second BTS or cell. With respect to the present invention, it is desirable to prevent a continual cycling between ANCs as if the mobile terminal is in a geographic location wherein the relative pilot signal strength are nearly equal and are toggling in terms of which one is greatest. In such a scenerio, the mobile terminal could potentially request handoff to dummy neighborlist BTSs repeatedly. Accordingly, a hysteresis filter is added. In one embodiment of the invention, the mobile terminal is formed to not request and hand-off to a BTS which it had dropped a connection unless the signal strength of that BTS is stronger than the signal strength of the new BTS or cell by a specified amount. If the specified amount is, for example, 3 dB, the mobile terminal does not request a hand-off unless the pilot channel of the dropped BTS or cell is 3 dB stronger than that of the cell or BTS that is presently providing the 1xEVDO forward link transmissions.

In an alternate embodiment of the invention, the BTS receives the pilot signal strength values being received by mobile in a reverse link control channel and makes the decision to instruct the mobile terminal to drop the connection based upon the received signal strengths using similar hysterisis logic described above. Finally, as yet another aspect of the hysterisis filter that may be implelemented either in the mobile terminal or ANC, the signal strength difference and hysteresis logic is only applied for a hand-off request to a previous cell or BTS that arrives within a specified time period after the connection was dropped to that cell or BTS.

Figure 7:
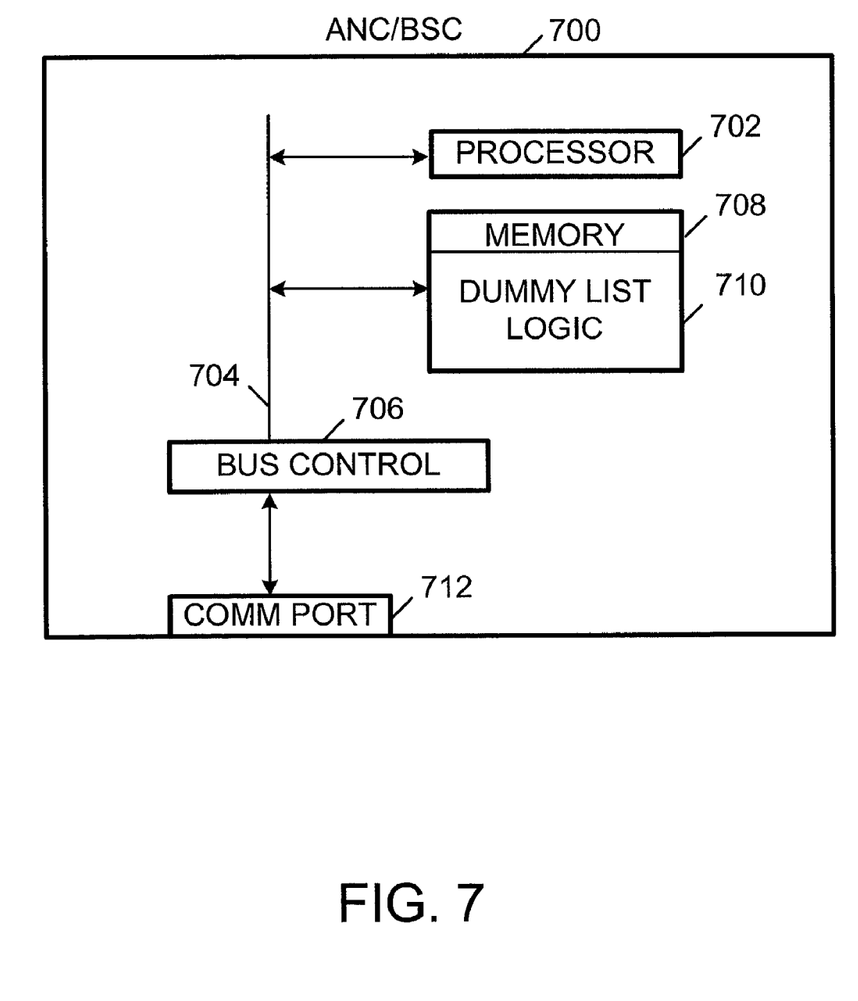
FIG. 7 is a functional block diagram that illustrates one embodiment of an ANC/BSC formed according to one embodiment of the invention.

FIG. 7 is a functional block diagram that illustrates one embodiment of an ANC/BSC formed according to one embodiment of the invention. Referring now to FIG. 7, an ANC/BSC 700 includes a processor 702 that is coupled to communicate over a bus 704. A bus controller 706 controls communications over bus 704. A memory 708 further is coupled to bus 704 and includes computer instructions that are retrieved by processor 702 over bus 704 for execution. The computer instructions within memory 708 define the operational logic of ANC/BSC 700. For example, memory 708 includes a memory portion 710 that includes computer instructions that define the ANC/BSC operational logic for generating a dummy list of BTSs for transmission to a mobile terminal in a border cell. More specifically, the computer instructions within memory portion 710 define logic for generating the dummy list of BTSs and for responding to the receipt of a hand-off request to a BTS listed in the dummy list. More specifically, the computer instructions within memory portion 710 define logic that is described by the signal sequence diagram and flowcharts and other descriptions herein of the present embodiment of the invention. Bus controller 706 further is coupled to a communication port 712 through which ANC/BSC 700 communicates with external devices. Thus, when processor 702 retrieves the computer instructions stored within memory portion 710, it operates according to the methods and logic disclosed herein.

The invention disclosed herein is susceptible to various modifications and alternative forms. Specific embodiments therefore have been shown by way of example in the drawings and detailed description. It should be understood, however, that the drawings and detailed description thereto are not intended to limit the invention to the particular form disclosed but, on the contrary, the invention is to cover all modifications, equivalents and alternatives falling within the spirit and scope of the present invention as defined by the claims. For example, references to ANCs include BSCs and vice-versa because their functionality is similar and they are often used interchangeably for certain types of networks.

The invention claimed is:

1. An access network controller (ANC)/base station controller (BSC), comprising:
   a bus coupled to the processor for transmitting computer instructions and control signals to and from the processor within the ANC/BSC;
   memory coupled to the bus, the memory including computer instructions that define operational logic for causing the ANC/BSC to generate a dummy list of base stations (BTS) to a mobile terminal upon specified conditions; and
   a processor for executing computer instructions wherein the processor retrieves the computer instructions from the memory over the bus and executes the computer instructions to generate the dummy list of BTSs, the computer instructions stored within the memory define logic to prompt the processor to direct a mobile terminal to drop a call whenever the mobile terminal requests a handoff to a BTS listed in a dummy list transmitted to the mobile terminal.

2. The ANC/BSC of claim 1 wherein the computer instructions define logic to prompt the ANC/BSC to determine whether a dummy list of BTSs should be generated and transmitted to the mobile terminal.

3. The ANC/BSC of claim 2 wherein the computer instructions define logic to determine what BTSs are physically proximate but are served by a different ANC/BSC.

4. The ANC/BSC of claim 2 wherein the computer instructions define logic to enable the ANC/BSC to determine if the mobile terminal is in a border cell.

5. The ANC/BSC of claim 1 wherein the computer instructions define logic for enabling the ANC/BSC to determine which physically proximate cells to the mobile terminal are neighboring cells and which physically proximate cells are dummy cells.

6. The ANC/BSC of claim 5 wherein the computer instructions define logic for enabling the ANC/BSC to identify each BTS of the neighboring cells in the neighbor list.

7. The ANC/BSC of claim 5 wherein the computer instructions define logic for enabling the ANC/BSC to identify each BTS of the physically proximate cells should be included in a dummy list portion of the neighbor list.

8. A wireless data packet communication network, comprising:
   a first BTS communicatively coupled with a mobile terminal, the first BTS and mobile terminal forming a part of a point-to-point protocol communication link data packet connection;
   an ANC operatively coupled with the first BTS, the ANC for generating a neighbor list for transmission to the mobile terminal by way of the first BTS, the ANC further including:
   logic circuitry to determine what BTSs should be included in the neighbor list for hand-off purposes;
   logic circuitry to determine what BTSS should be included in a dummy list portion of the neighbor list; and
   logic circuitry to generate a command to the mobile terminal to drop the data packet connection whenever the mobile terminal generates a hand-off request to a BTS included in the dummy list portion.

9. The wireless data packet communication network of claim 8 wherein the ANC further includes logic circuitry to generate a response to the mobile terminal whenever the mobile terminal generates a hand-off request to a BTS included in the dummy list portion.

10. The wireless data packet network of claim 8 wherein the ANC is formed to determine whether to add BTSs in a dummy list portion of a neighbor list according to whether the mobile terminal is located in a border cell.

* * * * *